(12) United States Patent
Nishida et al.

(10) Patent No.: US 8,892,909 B2
(45) Date of Patent: Nov. 18, 2014

(54) CLOCK AND POWER CONTROL FOR INTERMITTENT OPERATION OF DECODER

(75) Inventors: Yoichi Nishida, Kanagawa (JP); Takayuki Ejima, Fukuoka (JP); Akihiro Miyazaki, Osaka (JP); Yasunori Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 1862 days.

(21) Appl. No.: 11/817,594

(22) PCT Filed: Dec. 4, 2006

(86) PCT No.: PCT/JP2006/324145
§ 371 (c)(1),
(2), (4) Date: Sep. 10, 2008

(87) PCT Pub. No.: WO2007/069486
PCT Pub. Date: Jun. 21, 2007

(65) Prior Publication Data
US 2009/0070610 A1    Mar. 12, 2009

(30) Foreign Application Priority Data

Dec. 13, 2005 (JP) ................................. 2005-358771

(51) Int. Cl.
*G06F 1/32* (2006.01)
(Continued)

(52) U.S. Cl.
CPC ............... *G11B 20/10* (2013.01); *H04N 5/781* (2013.01); *G11B 19/02* (2013.01); *H04N 9/8042* (2013.01); *G06F 1/3203* (2013.01); *H04N 9/8047* (2013.01); *Y02B 60/1217* (2013.01); *Y02B 60/32* (2013.01); *G06F 1/324* (2013.01); *H04N 9/877* (2013.01); *H04N 5/907* (2013.01); *H04N 5/85* (2013.01); *H04N 19/00533* (2013.01)
USPC ........................................................ 713/300

(58) Field of Classification Search
USPC ........................................................ 713/300
See application file for complete search history.

(56) References Cited

U.S. PATENT DOCUMENTS 5,699,336 A    12/1997   Maeda et al.
5,963,900 A  * 10/1999   Yamauchi ..................... 704/230
(Continued)

FOREIGN PATENT DOCUMENTS

EP    1 113 446 A1    7/2001
JP    09-231688 A     9/1997
(Continued)

OTHER PUBLICATIONS

Supplementary European Search Report dated Apr. 8, 2010.
(Continued)

*Primary Examiner* — Thomas Lee
*Assistant Examiner* — Eric Chang
(74) *Attorney, Agent, or Firm* — Pearne & Gordon LLP

(57) ABSTRACT

A data processor comprises a decoder for decoding the compressed data into decoded data while reading the compressed data from a first data storage, a second data storage for storing therein the decoded data, a DA converter for converting the decoded data into an analog signal while reading the decoded data in real-time, a first controller for controlling the decoder to perform intermittent operation by executing a process between reading the compressed data and storing the decoded data at a speed faster than real-time, a clock/power controller for making a restriction of power consumption of the decoder and the first controller in downtime of the intermittent operation, a second controller for outputting a control signal in accordance with the storage state of the decoded data, and an activation controller for controlling the clock/power controller to lift the restriction in response to reception of the control signal.

2 Claims, 10 Drawing Sheets

(51) Int. Cl.
  *G11B 19/02* (2006.01)
  *G11B 20/10* (2006.01)
  *H04N 9/877* (2006.01)
  *H04N 19/44* (2014.01)
  *H04N 5/781* (2006.01)
  *H04N 9/804* (2006.01)
  *H04N 5/907* (2006.01)
  *H04N 5/85* (2006.01)

(56) References Cited

U.S. PATENT DOCUMENTS

| | | | |
|---|---|---|---|
| 6,839,309 B1 | 1/2005 | Yunoki et al. | |
| 6,968,468 B2 * | 11/2005 | Lam | 713/320 |
| 7,213,086 B2 * | 5/2007 | Wyatt et al. | 710/52 |
| 7,230,892 B2 * | 6/2007 | Nishio | 369/47.12 |
| 7,315,764 B1 * | 1/2008 | Sutardja et al. | 700/94 |
| 7,343,544 B2 * | 3/2008 | Koseki | 714/769 |
| 7,450,818 B2 * | 11/2008 | Natsubori et al. | 386/291 |
| 7,584,312 B2 * | 9/2009 | Kuroda et al. | 710/52 |
| 2004/0017630 A1 | 1/2004 | Akagi et al. | |

FOREIGN PATENT DOCUMENTS

| | | |
|---|---|---|
| JP | 11-122586 | 4/1999 |
| JP | 2004-062932 A | 2/2004 |
| JP | 2004-087052 A | 3/2004 |
| JP | 2006-133698 | 5/2006 |

OTHER PUBLICATIONS

International Search Report dated Jan. 24, 2007.

* cited by examiner

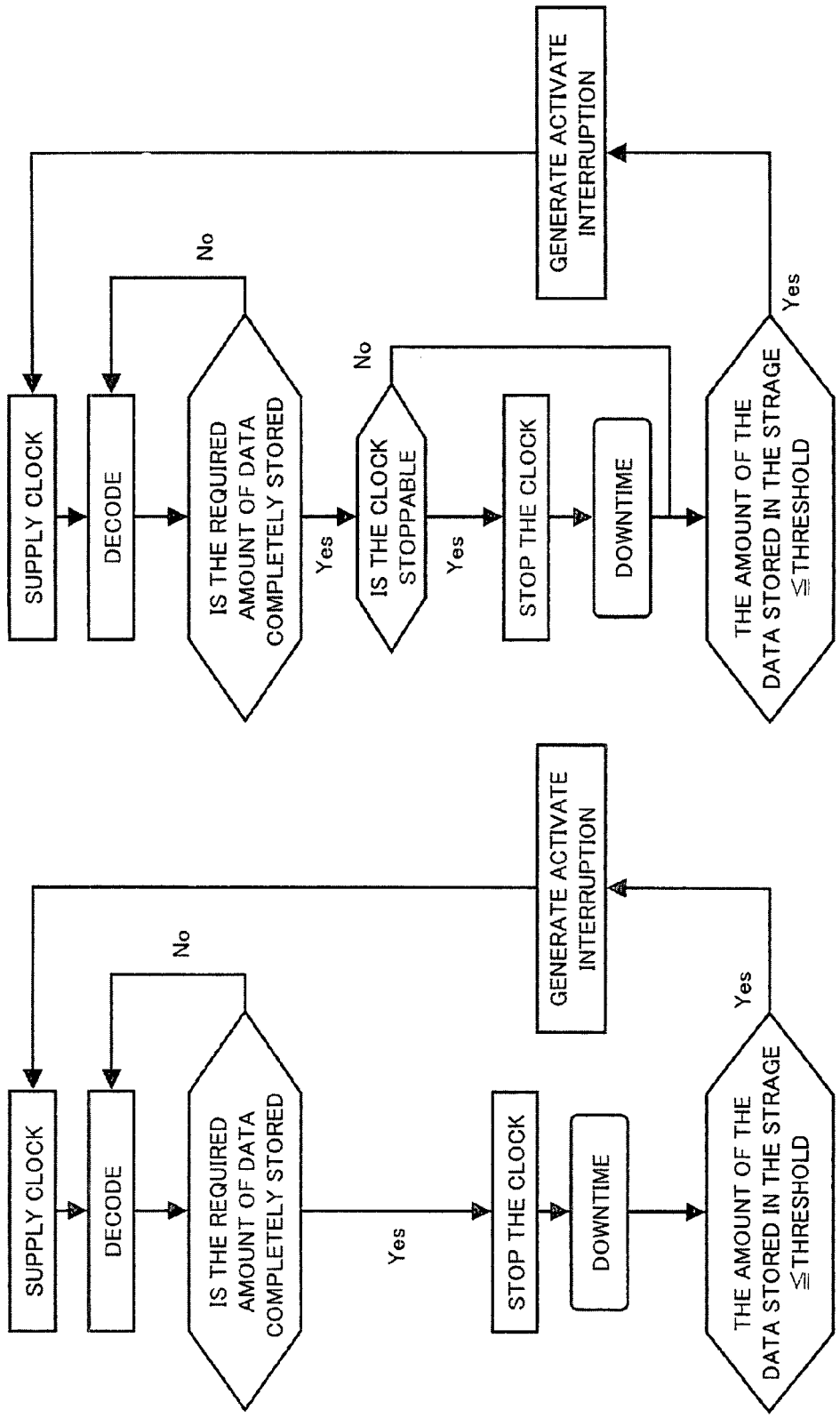

CLOCK AND POWER CONTROL FOR INTERMITTENT OPERATION OF DECODER

TECHNICAL FIELD

The present invention relates to a data processor for AV reproduction of audio and video, and more particular to a data processor suitable for a mobile device designed to reduce power consumption at the time of the reproduction.

BACKGROUND ART

In recent years, there have been proposed a wide variety of terminals, such as mobile phones, handheld terminals and cordless monitors, having a feature of AV reproduction such as audio reproduction and video reproduction, and a feature for viewing and listening of broadcasting such as radio broadcasting and television broadcasting. Additionally, there have so far been also proposed a wide variety of compression methods each involving a heavy processing load to meet requirements for transmitting or storing high-compressed contents. On the other hand, there have been many requirements for reproducing continuously to view and listen for long periods of time. The mobile terminal powered by battery is therefore required to reduce power consumption to be continuously operable for long periods of time. The aforementioned problem is resolved by a conventional technology described hereinafter.

The conventional data processor of this type is designed to receive and decode broadcast waves intermittently to store the result of decoding into a memory (see, for example, Patent Document 1).

FIG. 11 shows a schematic diagram of the conventional data processor disclosed in the Patent Document 1.

In FIG. 11, the conventional data processor comprises a broadcast receiver 1 for receiving broadcast waves a decoder 2 for decoding data obtained from the broadcast waves received by the broadcast receiver 1, a data storage 3 for storing therein decoded data indicative of the result of decoding by the decoder 2, a DA converter 4 for converting the data stored in the data storage 3 into an analog signal, a system controller 5 for controlling an operation of each part of the data processor, a power supply 6 for controlling power supply to each part of the data processor, and a timer 7 for notifying a timing of activation of the decoder 2.

The conventional data processor thus constructed receives and decodes the broadcast data updated in several times on one day, while making the broadcast receiver 1 and the decoder 2 perform intermittent operation. The conventional data processor, in particular, starts supplying the power to the broadcast receiver 1 and the decoder 2 in accordance with interruption of the timer 7 before receiving the broadcast waves. The conventional data processor then receives the broadcast waves with the broadcast receiver 1, and stores the result of decoding by the decoder 2 into the data storage 3. The system controller 5 then controls the broadcast receiver 1, the decoder 2 and the data storage 3 to halt each process, and stops supplying the power from the power supply 6 to the broadcast receiver 1 and the decoder 2.

As described above, the conventional data processor is designed to stop supplying the power in downtime of the intermittent operation so as to make a reduction of the power consumption under a standby state.

Patent Document 1: Japanese Patent Laid-Open Publication H11-122586

DISCLOSURE OF INVENTION

Problem to be Solved by the Invention

In recent year, however, advancement in semiconductor manufacturing technology, especially in miniaturization technology, contributes to increase the number of transistors implementable on a single chip and to increase the variation of functions accumulated on the single chip so much as to make the single chip constitute a system.

On the other hand, the high performance and large scale system LSI as previously mentioned tends to increase the power consumption resulting from increasing clock frequency for throughput enhancement and increasing load on a clock tree with heavy load capacity of large-scale wiring and the like.

The transistors have leak currents, such as sub-threshold leak currents and gate leak currents. The leak currents have been increased in accordance with miniaturizing of process and increasing of operation frequency. The leak currents of the whole system are therefore increased by heavy use of the transistors.

As will be seen from above description, the consumption current consumed by the system LSI only having the power and clock supplied thereto is increased. The consumption current is hereinafter referred to as "offset current".

The conventional data processor disclosed in the Patent Document 1 is designed to control supply of the power to start and stop with respect to the timer. The conventional data processor can therefore reduce the power consumption under the use for data broadcast with which data is updated in several times on one day.

However, the conventional data processor can not be applied to use of decoding continuous compressed data, such as AV reproduction data, broadcast data or the like, to be reproduced, viewed and listened in real-time.

It is, therefore, an object of the present invention to provide a data processor which can reduce the power consumption with the continuous compressed data, such as AV reproduction data, broadcast data or the like, to be reproduced, viewed and listened.

Means for Resolving the Problem

According to one aspect of the present invention, there is provided a data processor, comprising: a first data storage for storing therein compressed data; a decoder for decoding the compressed data into decoded data to output while reading the compressed data from the first data storage; a second data storage for storing therein the decoded data outputted from the decoder; a DA converter for converting the decoded data into an analog signal while reading the decoded data from the second data storage in real-time; a first controller for controlling at least the decoder to perform intermittent operation by executing a process between reading the compressed data and storing the decoded data at a speed faster than real-time; a clock/power controller for controlling supply of at least one of clock and power to the decoder and the first controller, and restricting supply of at least one of the clock and power to the decoder and the first controller to make a restriction of power consumption of upstream from the second data storage in downtime of the intermittent operation; a second controller for managing a storage status of the decoded data stored in the second data storage, and outputting a control signal in accordance with the storage status; and an activation controller for controlling the clock/power controller to lift the restriction of the power consumption of the upstream from the second data storage in response to reception of the control signal.

In accordance with the above construction, the data processor according to the present invention is designed to execute the process between reading the compressed data and storing the decoded data at the speed faster than real-time to restrict the power consumption of the upstream from the second data storage in the downtime of the intermittent operation. The data processor can therefore reduce the power consumption with the continuous compressed data, such as AV reproduction data, broadcast data or the like, to be reproduced, viewed and listened.

Effects of the Invention

The present invention provides the data processor having effect to reduce the power consumption with the continuous compressed data, such as AV reproduction data, broadcast data or the like, to be reproduced, viewed and listened. The data processor mounted on the mobile phone or a mobile device each powered by battery can particularly make reproduction time and viewing-and-listening time be longer.

BRIEF DESCRIPTION OF THE DRAWINGS

FIG. 5 is a first control flow chart showing an intermittent operation of the second preferred embodiment of the data processor according to the present invention.

FIG. 6 is a second control flow chart showing the intermittent operation of the second preferred embodiment of the data processor according to the present invention.

EXPLANATION OF REFERENCE NUMERALS

Figure 1:
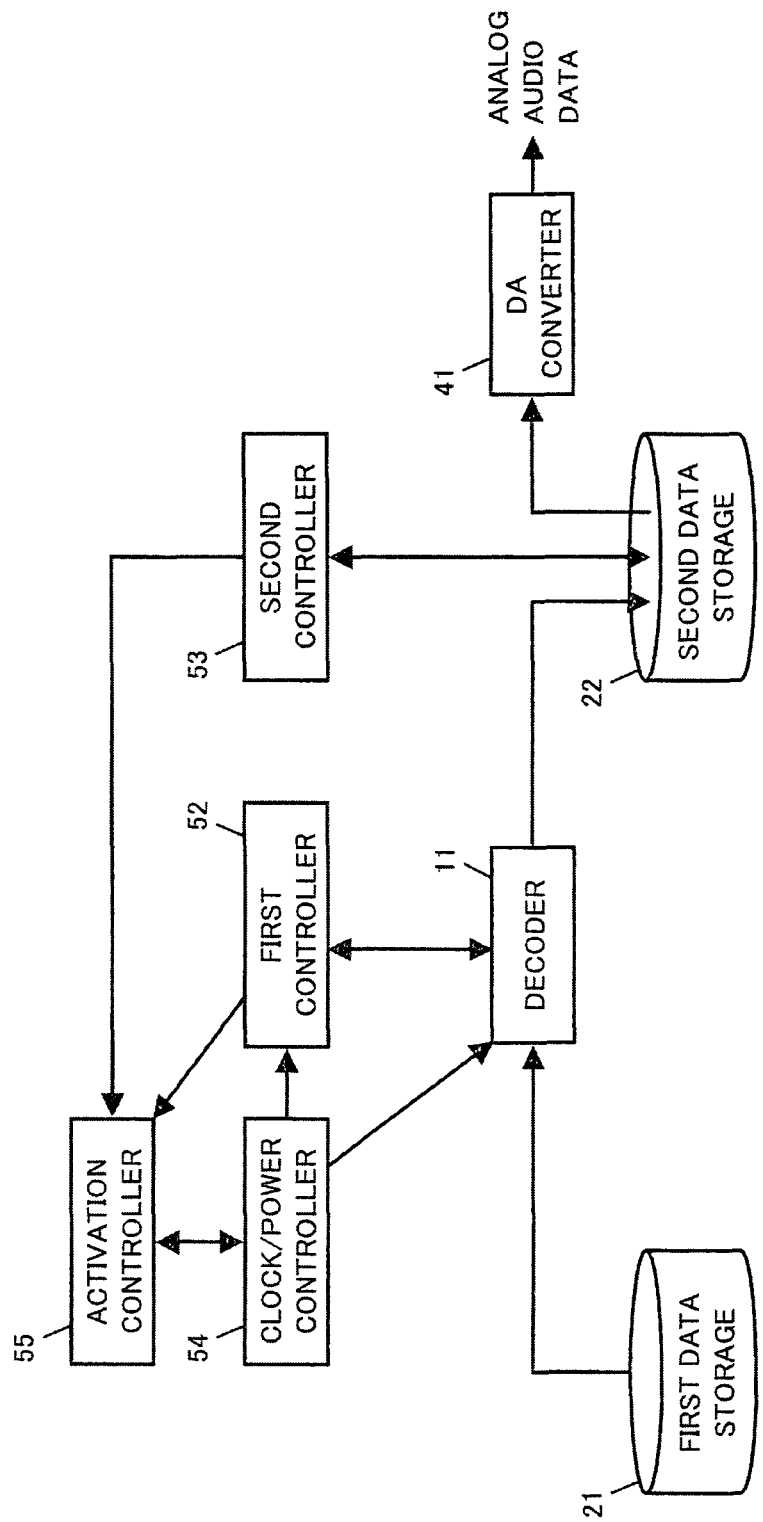
FIG. 1 is a schematic diagram showing a first preferred embodiment of the data processor according to the present invention.

11 decoder
21 first data storage
22 second data storage
23 third data storage
24 fourth data storage
31 first data transferrer
32 second data transferrer
41 DA converter
51 system controller
52 first controller
53 second controller
54 clock/power controller
55 activation controller
61 clock supply
71 power supply
81 storage amount manager
82 timer
91 broadcast receiver

DESCRIPTION OF THE PREFERRED EMBODIMENTS

The preferred embodiments of the present invention will be described hereinafter with reference to the drawings.
(First Preferred Embodiment)

FIG. 1 shows a schematic diagram of the first preferred embodiment of the data processor according to the present invention. In FIG. 1, the first preferred embodiment of the data processor according to the present invention comprises a first data storage 21 for storing therein compressed data, a decoder 11 for decoding the compressed data into decoded data while reading the compressed data from the first data storage 21, a second data storage 22 for storing therein the decoded data outputted from the decoder 11, a DA converter 41 for converting the decoded data into an analog signal while reading the decoded data from the second data storage 22 in real-time, a first controller 52 for controlling each part of the data processor, a second controller 53 for managing a storage state of the decoded data stored in the second data storage 22, and producing a control signal in accordance with the storage state, a clock/power controller 54 for controlling power consumption of upstream, including the decoder 11 and the first controller 52, from the second data storage 22, and an activation controller 55 for controlling the clock/power controller 54 to lift restriction of the power consumption of the upstream from the second data storage 22 in response to reception of the control signal produced by the second controller 53.

The first data storage 21 is constituted by a storage medium such as a buffer. The first data storage 21 is designed to store therein the compressed data stored in a storage device constituted by a magnetic disc such as a hard disc, an optical disc such as a CD or DVD, or a semiconductor memory device such as a flash memory or a memory card. The first data storage 21 may be designed to store therein the compressed data sent from a broadcast receiver (not shown in the drawings) for receiving a broadcast wave to produce the compressed data, or sent from a network interface (not shown in the drawings) for producing the compressed data from data sent via a network.

The first data storage 21 may be constituted by a storage medium, such as a magnetic tape, a magnetic disc, a semiconductor memory, or a hard disc, attachable to the data processor with preliminarily storing the compressed data therein.

The compressed data may be audio data compressed in accordance with the AAC (Advanced Audio Codec), MP3 (Moving Picture Experts Group 1 Audio Layer 3) or the like. The compressed data may be video data compressed in accordance with the MPEG-2, MPEG-4, Motion JPEG (Joint Photographic Experts Group) or the like. In this embodiment, the compressed data is the audio data compressed in accordance with the AAC.

The compressed data may be encrypted in accordance with the DES (Data Encryption Standard), AES (Advanced Encryption Standard) or the like. In this case, the decoder 11 is constructed to decode the compressed data after decrypting the encryption of the compressed data.

The decoder 11 is constituted by a DSP (Digital Signal Processor) programmed to read the compressed data from the first data storage 21 by an amount directed by the first controller 52, and to decode the compressed data into decoded data. In this embodiment, the decoder 11 is constructed to produce PCM (Pulse Code Modulation) data as the decoded data.

The decoder 11 may be constituted by other kind of processor such as a CPU (Central Processing Unit). The decoder 11 may be also constituted by a hardware circuit or a combination of the processor and the hardware circuit.

The second data storage 22 is constituted by a storage medium such as an SRAM (Static Random Access Memory). The first controller 52 is constituted by a processor such as the CPU programmed to control each part of the data processor.

The first controller 52 is designed to perform condition control of activation, deactivation and operation of the DA converter 41, setting-change control of frequency of clock and voltage of power for the clock/power controller 54, condition control of activation, deactivation and operation of the second controller 53, and the like.

The first controller 52 is designed to control at least the decoder 11 to perform intermittent operation by executing a process between reading the compressed data and storing the decoded data at a speed faster than real-time.

In uptime of the intermittent operation, to execute the process between reading the compressed data and storing the decoded data at the speed faster than real-time, the first controller 52 is designed to control the clock/power controller 54 to increase the frequency of the clock supplied to the decoder 11 or designed to control the decoder 11 to operate with a dedicated circuit such as an accelerator (not shown in the drawings).

In downtime of the intermittent operation, on the other hand, the first controller 52 is designed to control the clock/power controller 54 to stop supplying the clock to the decoder 11 or to decrease the frequency of the clock supplied to the decoder 11.

Under the condition that the first controller 52 can execute the process between reading the compressed data and storing the decoded data at the speed faster than real-time without speeding up, the first controller 52 may be designed to direct the decoder 11 to start decoding, and designed to control the decoder 11 to take a deactivatable state in response to reception of a completion notice of decoding from the decoder 11.

As referred to hereinafter with reference to FIG. 4, the first controller 52 is designed to direct the decoder 11 to start decoding of the multiple frames, for example, 5 frames, of the compressed data, and designed to control the clock/power controller 54 to make the restriction of the power consumption of the upstream from the second data storage 22 after controlling the decoder 11 to take the deactivatable state in response to the reception of the completion notice of decoding from the decoder 11.

The first controller 52 is designed to direct the decoder 11 to decode the compressed data by an amount greater or equal to the amount for one frame without making the amount of the decoded data stored in the second data storage 22 exceed a capacity of the second data storage 22. The first controller 52 is preferred to direct the decoder 11 to decode the compressed data by more amount for the purpose of reducing overheads of controlling the decoder 11 to be switched between the deactivatable and activatable state.

The second controller 53 is designed to produce the control signal when the amount of the decoded data stored in the second data storage 22 becomes to be less or equal to a predetermined amount. The predetermined amount is determined to the extent that the amount of the decoded data stored in the second data storage 22 is not to be 0.

The activation controller 55 is designed to control the clock/power controller 54 to lift the restriction of the power consumption of the upstream from the second data storage 22 in response to the reception of the control signal produced by the second controller 53.

The clock/power controller 54 is designed to stop supplying the clock to the decoder 11 and the first controller 52 when controlled by the first controller 52 to make the restriction of the power consumption of the upstream from the second data storage 22. The clock/power controller 54 is designed to start supplying the clock to the decoder 11 and the first controller 52 when controlled by the activation controller 55 to lift the restriction of the power consumption of the upstream from the second data storage 22.

The clock/power controller 54 may be designed to start supplying the clock to the first controller 52 when controlled by the activation controller 55 to lift the restriction of the power consumption of the upstream from the second data storage 22, and designed to start supplying the clock to the decoder 11 in response to the direction of the first controller 52 having the clock supplied thereto.

The first controller 52 is designed to direct the decoder 11 to decode more 5 frames of the compressed data after controlling the decoder 11 to take the activatable state.

Figure 2:
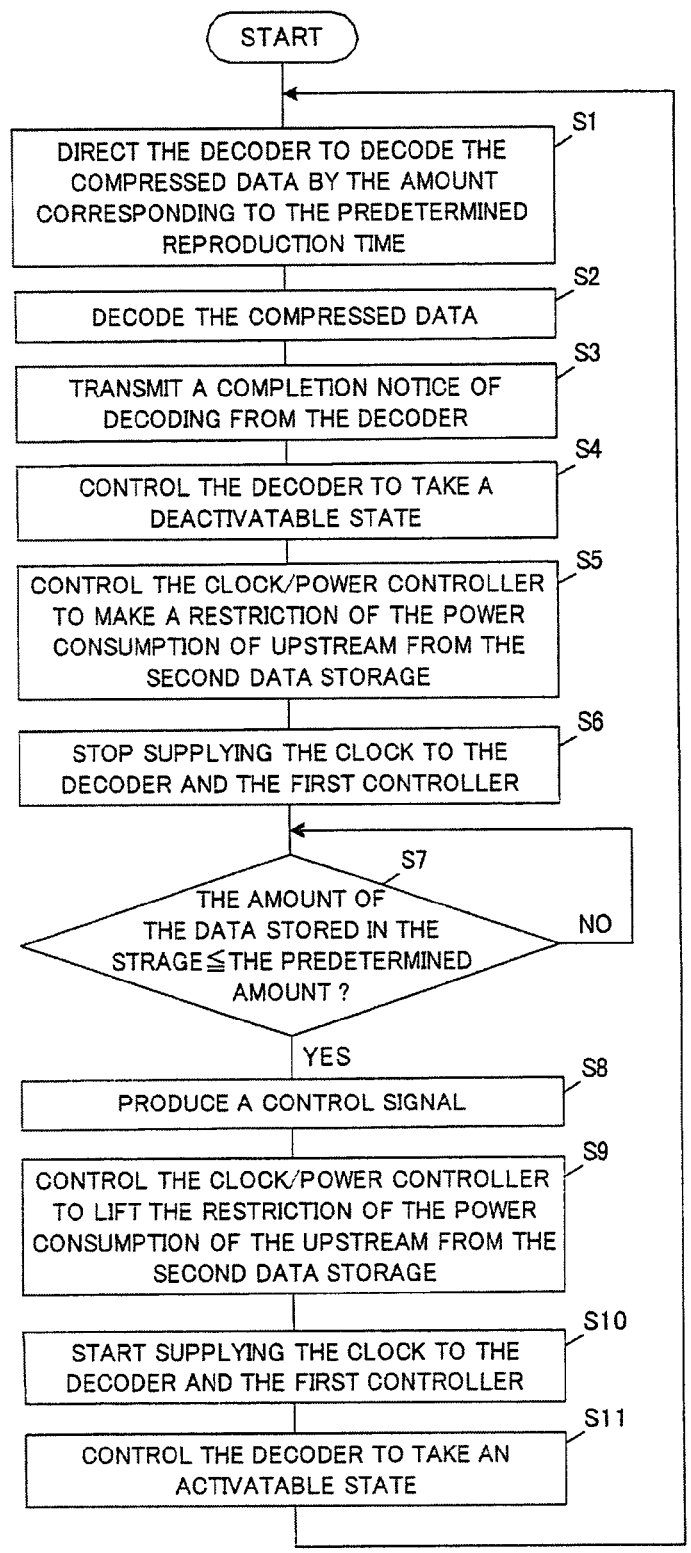
FIG. 2 is a flow chart showing an operation of the first preferred embodiment of the data processor according to the present invention.

The operation of the data processor thus constructed will be described hereinafter with reference to FIG. 2.

The decoder 11 is directed by the first controller 52 to decode the compressed data by the amount corresponding to the predetermined reproduction time, by way of example, 5 frames (S1). The directed amount of the compressed data stored in the first data storage 21 is then decoded by the decoder 11 (S2), and is stored into the second data storage 22. The completion notice is then transmitted from the decoder 11 to the first controller 52 (S3).

The decoder 11 is then controlled to take the deactivatable state by the first controller 52 having the completion notice received therein (S4), and the clock/power controller 54 is controlled to make the restriction of the power consumption of the upstream from the second data storage 22 (S5).

The supplying of the clock to the decoder 11 and the first controller 52 is then stopped by the clock/power controller 54 controlled by the first controller 52 (S6).

The amount of the decoded data stored in the second data storage 22 is decrease with the passage of time, while the storing of the decoded data into the second data storage 22 is stopped. This results from the fact that the decoded data is read from the second data storage 22 by the DA converter 41 in real-time.

When the amount of the decoded data stored in the second data storage 22 is less or equal to the predetermined amount (S7), the control signal is produced by the second controller 53 (S8). The clock/power controller 54 is controlled by the activation controller 55 having the control signal received therein to lift the restriction of the power consumption of the upstream from the second data storage 22 (S9).

The supplying of the clock to the decoder 11 and the first controller 52 is then started by the clock/power controller 54 controlled by the activation controller 55 (S10). The decoder 11 is then controlled to take the activatable state by the first controller 52 having the clock supplied thereto (S11), and directed by the first controller 52 to decode the compressed data by the amount corresponding to the predetermined reproduction time (S1).

As will be seen from the foregoing description, it is to be understood that the first preferred embodiment of the data processor according to the present invention is designed to execute the process between reading the compressed data and storing the decoded data at the speed faster than real-time to restrict the power consumption of the upstream from the second data storage 22 in the downtime of the intermittent operation. The data processor can therefore reduce the power consumption with the continuous compressed data, such as AV reproduction data, broadcast data or the like, to be reproduced, viewed and listened.

The data processor is designed to execute the process between reading the compressed data from the first data storage 21 and storing the decoded data into the second data storage 2 at the speed faster than real-time. The data processor can therefore divide explicitly processing time from non-processing time to make the decoder 11 perform the intermittent operation.

There has been described in the forgoing embodiment about the fact that the clock/power controller 54 is designed to stop supplying the clock to the decoder 11 and the first controller 52 to make the restriction of the power consumption of the upstream from the second data storage 22, and designed to start supplying the clock to the decoder 11 and the first controller 52 to lift the restriction of the power consumption of the upstream from the second data storage 22.

On the other mode, the clock/power controller 54 may be designed to decrease the frequency of the clock to be supplied to the decoder 11 and the first controller 52 to make the restriction of the power consumption of the upstream from the second data storage 22, and designed to increase the frequency of the clock to be supplied to the decoder 11 and the first controller 52 to lift the restriction of the power consumption of the upstream from the second data storage 22.

Under the case that the clock/power controller 54 is constructed to control the clock to be supplied to the decoder 11 and the first controller 52 as mentioned above, the clock/power controller 54 may be designed to control the supply of the clock produced thereby or produced by an outside clock generator.

The clock/power controller 54 may be designed to decrease the voltage applied to the decoder 11 and the first controller 52 to make the restriction of the power consumption of the upstream from the second data storage 22, and designed to increase the voltage applied to the decoder 11 and the first controller 52 to lift the restriction of the power consumption of the upstream from the second data storage 22.

The clock/power controller 54 may be designed to stop applying the voltage to the decoder 11 and the first controller 52 to make the restriction of the power consumption of the upstream from the second data storage 22, and designed to start applying the voltage to the decoder 11 and the first controller 52 to lift the restriction of the power consumption of the upstream from the second data storage 22.

Under the case that the clock/power controller 54 is constructed to control the voltage to be applied to the decoder 11 and the first controller 52 as mentioned above, the clock/power controller 54 may be designed to control the apply of the voltage generated thereby or generated by an outside power supply.

The clock/power controller 54 may be designed to restrict power consumption of the activation controller 55 without making the activation controller 55 halt at the time of the restriction of the decoder 11 and the first controller 52.

While there has been described in the forgoing embodiment about the fact that the second controller 53 is designed to produce the control signal in accordance with the amount of the decoded data stored in the second data storage 22, the second controller 53 may be constituted by a timer to produce the control signal in accordance with the time measured by the timer.

In this case, the second controller 53 is constructed to produce the control signal when a predetermined time is passed after the restriction of the power consumption of the upstream from the second data storage 22 is made. The predetermined time is determined to the extent that the amount of the decoded data stored in the second data storage 22 is not to be 0.

There has been described in the forgoing embodiment about the fact that the first controller 52 is designed to control the clock/power controller 54 to make the restriction of the power consumption of the upstream from the second data storage 22 after controlling the decoder 11 to take the deactivatable state in response to the reception of the completion notice of decoding from the decoder 11.

On the other mode, the data processor may comprise a third data storage for storing therein the decoded data produced by the decoder 11, and a data transferrer for transferring the decoded data from the third data storage to the second data storage 22. In this case, the first controller 52 is constructed to control the clock/power controller 54 to make the restriction of the power consumption of the upstream from the second data storage 22 after controlling the decoder 11 and the data transferrer to take the deactivatable state in response to the reception of the completion notice of transferring of the directed amount of the decoded data from the decoder 11.

As previously mentioned, the clock/power controller 54 is required to deactivate at least the decoder 11 in the downtime of the intermittent operation, but it is not intended to limit to the decoder 11. The clock/power controller 54 may be designed to deactivate further other blocks in accordance with a system construction, because of the fact that it is possible to stop supplying the clock or applying the voltage to the blocks not required to activate in the downtime of the intermittent operation.

The second controller 53 may be designed to produce the control signal indicating that the amount of the decoded data stored in the second data storage 22 is greater or equal to a predetermined amount when the amount of the decoded data stored in the second data storage 22 is greater or equal to the predetermined amount. In this case, the first controller 52 is constructed to control the clock/power controller 54 to make the restriction of the power consumption of the upstream from the second data storage 22 after controlling the decoder 11 and the data transferrer to take the deactivatable state in response to the reception of the control signal. The predetermined amount is determined to the extent that the amount of the decoded data stored in the second data storage 22 is not to be 0.

(Second Preferred Embodiment)

Figure 3:
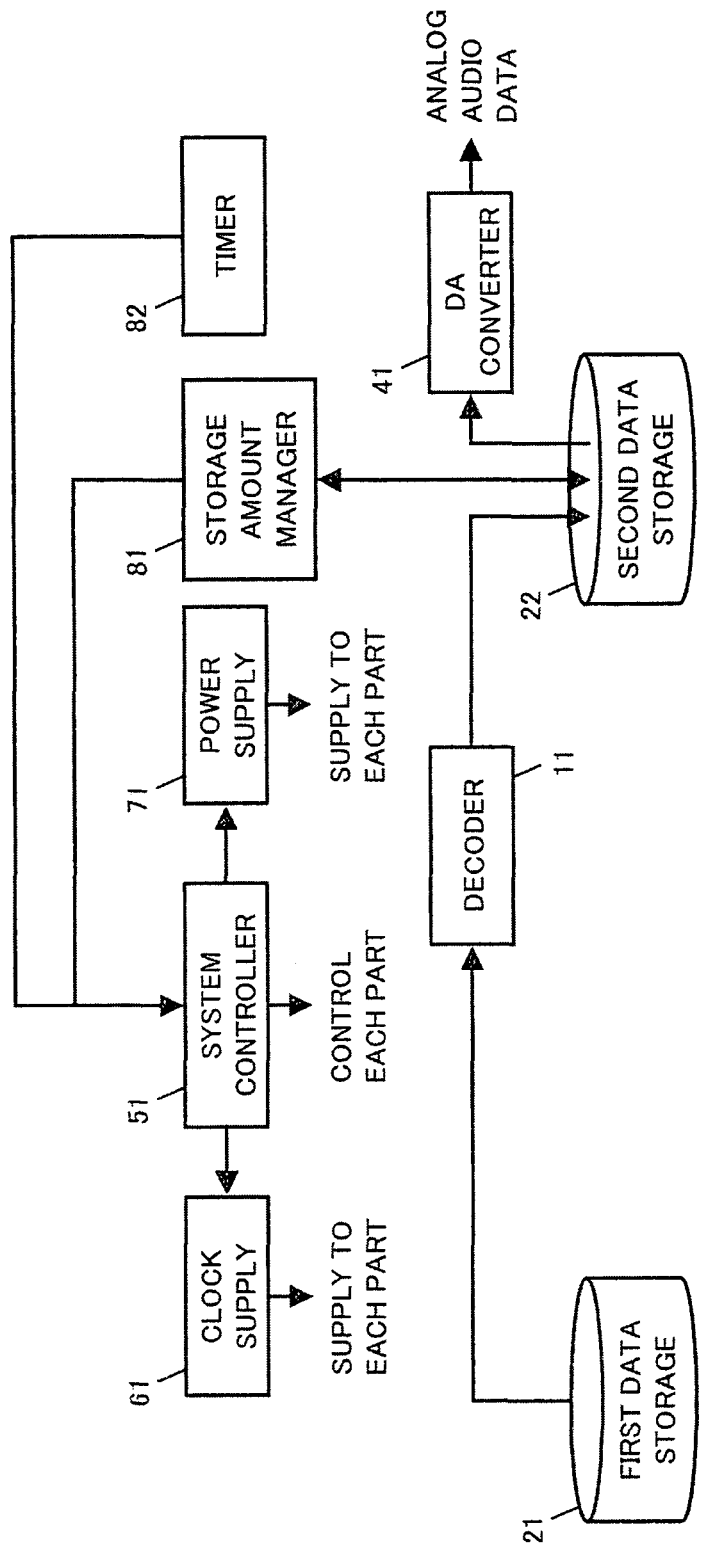
FIG. 3 is a schematic diagram showing a second preferred embodiment of the data processor according to the present invention.

FIG. 3 shows a schematic diagram of the second preferred embodiment of the data processor according to the present invention. In FIG. 3, the data processor comprises a first data storage 21 for storing therein compressed data, a decoder 11 for decoding the compressed data while reading the compressed data, a second data storage 22 for storing therein decoded data decoded by the decoder 11, a DA converter 41 for converting the decoded data into an analog signal, a clock supply 61 for generating and supplying clock, a power supply 71 for supplying power to each part of the data processor, a storage amount manager 81 for managing the amount of the data stored in the second data storage 22, a timer 82 for notifying activation timing to each part of the data processor, and a system controller 51 for controlling an operation of each part of the data processor.

In this embodiment, the system controller 51 constitutes a first controller and an activation controller according to the present invention. The storage amount manager 81 or the timer 82 constitutes a second controller according to the present invention. At least one of the clock supply 61 and the power supply 71 constitutes a clock/power controller according to the present invention.

The typical operation will be concretely described hereinafter.

The compressed data is stored in the first data storage 21. The first data storage 21 is, for example, constituted by a memory card. The compressed data is, for example, formed by AAC compressed audio data.

The decoder 11 reads the compressed data from the first data storage 21, and decodes the compressed data into the decoded data. The decoder 11 is, for example, constituted by a DSP, and designed to decode the compressed data in accordance with a software process.

The decoded data decoded by the decoder 11 is stored into the second data storage 22. The second data storage 22 is constituted by a semiconductor memory such as an SRAM. The decoded data is, for example, formed by PCM data.

The decoded data stored in the second data storage 22 is converted by the DA converter 41 into the analog signal to be outputted as analog audio data.

The clock supply 61 generates and supplies the clock needed for making each process performed.

The storage amount manager 81 manages the amount of the data stored in the second data storage 22, and notifies to the system controller 51 as appropriate.

The system controller 51 controls the decoder 11 to perform intermittent operation with dividing processing time from non-processing time explicitly by executing a process between reading the compressed data from the first data storage 21 and storing the decoded data into the second data storage 22 at a speed faster than real-time. The system controller 51 controls execution of the process of reading the decoded data from the second data storage 22 and following processes in real-time, and directs the clock supply 61 to stop supplying the clock to the first data storage 21 and the decoder 11 under the deactivation state in downtime of the intermittent operation.

Figure 4:
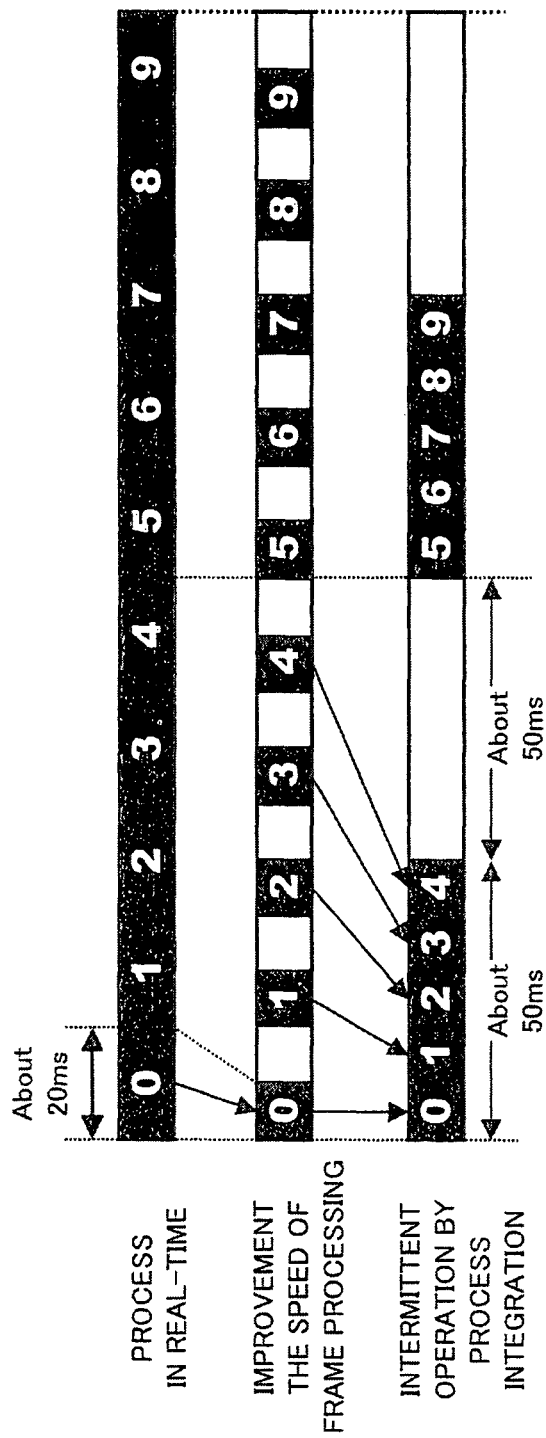
FIG. 4 is a timing chart showing an operation of the second preferred embodiment of the data processor according to the present invention.

FIG. 4 is a timing chart showing an operation of the second preferred embodiment of the data processor according to the present invention. The compressed data compressed by a digital signal compression, such as the SAC, is operated in unit of frames. Each period of the process for each frame is indicated by each reference number 0-9.

In real-time processing, each frame is decoded in synchronization with a frame cycle as previously mentioned in the background art. Each frame sampled at 48 kHz is operated at intervals of about 20 msec.

The data processor realizes to improve the speed of frame processing by enhancement of a throughput of the process for each frame to make a margin in processing time. To improve in the speed of the frame processing, there are various methods, such as improvement in a clock frequency, improvement in the throughput by a hardware accelerator, and improvement in a data transfer capability of a bus. Under the assumption that the throughput of the process for each frame is doubled, processing period of each frame is about 10 msec. In this case, the percentage of the processing time is 50% and that of the non-processing time is 50%.

The data processor realizes to divide explicitly the downtime from the uptime to perform the intermittent operation by process integration. The data processor, for example, continuously executes the processes for frames 1 to 4 in succession to the process for frame 0, and executes the processes for frames 6 to 9 in succession to the process for frame 5. The decoder 11 performs the intermittent operation at intervals of about 100 msec for the 48 kHz sampled data. The decoder 11 therefore executes the process in about 50 msec period and executes no process in about 50 msec period.

FIG. 5 is a first control flow chart showing the intermittent operation of the second preferred embodiment of the data processor according to the present invention. As shown in FIG. 5, when the required amount of the decoded data is completely operated and stored into the second data storage 22, the system controller 51 stops the clock and the intermittent operation transits to the downtime. FIG. 4 shows the example under which the decoder 11 collectively operates 5 frames of the decoded data. In the example, the downtime begins with completion of storing 5 frames of the data. On the other hand, when the system controller 51 is notified by interruption of the storage amount manager 81 that the amount of the decoded data remained in the second data storage 22 without being operated by the DA converter 41 is below the predetermined remaining amount threshold, the intermittent operation transits to the uptime from the downtime. The predetermined remaining amount threshold is determined to the extent that the decoded data is continuously supplied to the DA converter 41 from the time of the activate interrupt notification by the storage amount manager 81 to the time of the completion of storing the next frame of the decoded data into the second data storage 22 while the DA converter 41 operates in real-time.

The system controller 51 having the activate interrupt notification received therein directs the clock supply 61 to start supplying the clock, and controls to restart the process between reading the compressed data from the first data storage 21 and storing the decoded data into the second data storage 22.

As previously mentioned, the system controller 51 is designed to control the decoder 11 to perform the intermittent operation by executing the process between reading the compressed data from the first data storage 21 and storing the decoded data into the second data storage 22 at the speed faster than real-time. As a result, the offset current is decreased.

The data processor is designed to control the intermittent operation to transit to the downtime in accordance with the amount of the decoded data stored in the second data storage 22. The data processor can therefore decrease the load on the system controller 51 in amount more than that of polling processing, and can exactly control the intermittent operation even though the transfer amount of the data is inconstant.

The data processor is designed to control the intermittent operation to transit to the uptime in accordance with the amount of the decoded data stored in the second data storage 22 without being converted by the DA conversion. The data processor can therefore decrease the load on the system controller 51 in amount more than that of polling processing, and can exactly control the intermittent operation even though the transfer amount of the data is inconstant.

FIG. 6 is a second control flow chart showing the intermittent operation of the second preferred embodiment of the data processor according to the present invention. As shown in FIG. 6, when the required amount of the decoded data is completely operated and stored into the second data storage 22, the system controller 51 stops the clock and the intermittent operation transits to the downtime. FIG. 4 shows the example under which the decoder 11 collectively operates 5 frames of the decoded data. In the example, the downtime begins with completion of storing 5 frames of the decoded data. The system controller 51 then judges whether or not the intermittent operation can transit to the downtime. Under the non low power consumption mode, for example, the system controller 51 controls the intermittent operation not to transit to the downtime. Under the state that other process, such as a heavy loaded graphic process, is executed in the data processor, the system controller 51 controls the intermittent operation not to transit to the downtime.

On the other hand, when the system controller 51 is notified by interruption of the storage amount manager 81 that the amount of the decoded data remained in the second data storage 22 without being operated by the DA converter 41 is below the predetermined remaining amount threshold, the intermittent operation transits to the uptime from the downtime and restarts the process. The predetermined remaining amount threshold is determined to the extent that the decoded data is continuously supplied to the DA converter 41 from the time of the activate interrupt notification by the storage amount manager 81 to the time of the completion of storing the next frame of the decoded data into the second data storage 22 while the DA converter 41 operates in real-time.

The system controller 51 having the activate interrupt notification received therein directs the clock supply 61 to start supplying the clock, and controls to restart the process between reading the compressed data from the first data storage 21 and storing the decoded data into the second data storage 22.

As will be seen from the foregoing description, it is to be understood that the data processor is designed to control the clock and power not to stop supplying in accordance with the operation circumstance of the data processor. The data processor can therefore decrease the process needed for transition of the status (the process is hereinafter referred to as "overhead process"). This leads to the fact that the data processor can enhance responsiveness to the interruption in the downtime in which the data processor stop operating.

There has been described in the foregoing embodiment about the fact that the first data storage 21 is constituted by a memory card, but it is not intended to limit the present invention to the description. The data processor has the same effect under which the first data storage 21 is constituted by a storage medium, such as a magnetic tape, a magnetic disc, a semiconductor memory, or a hard disc, capable of storing therein the compressed data.

There has been described about the fact that the compressed data is formed by the AAC data, but it is not intended to limit the present invention to the description. The data processor has the same effect under which the compressed data is formed by compressed digital audio data, such as MP3 data.

While there has been described about the fact that the compressed data is audio data, the data processor has the same effect under which the compressed data is compressed image data, such as MPEG-2, MPEG4 or Motion JPEG data.

The compressed data may be encrypted in accordance with the DES, AES or the like. In this case, the data processor has the same effect under which the decoder 11 is constructed to decode the compressed data with decrypting the encryption of the compressed data.

There has been described about the fact that the decoder 11 is constituted by the DSP, but it is not intended to limit the present invention to the description. The data processor has the same effect under which the decoder 11 is constituted by other kind of processor such as a CPU. The decoder 11 may be also constituted by a hardware circuit or a combination of the processor and the hardware circuit.

There has been described about the fact that the system controller 51 is designed to stop supplying the clock in the downtime of the intermittent operation, but it is not intended to limit the present invention to the description. The data processor has the same effect under which the system controller 51 is designed to decrease a frequency of the clock from that of the clock in the uptime.

While there has been described about the fact that the system controller 51 is designed to stop supplying the clock in the downtime of the intermittent operation, the data processor has the same effect as decreasing the leak current under which the system controller 51 is designed to decrease a voltage applied by the power supply 71 or designed to stop applying the voltage (i.e. to apply 0V of the voltage). The data processor can also decrease the leak current under which the system controller 51 is designed to control a threshold voltage of a control transistor by controlling a substrate of a LSI.

There has been described about the fact that the decoding process is performed in unit of 5 frames, but it is not intended to limit the present invention to the description. The intermittent operation has the overhead process, such as clock control process and power control process, to transit between the downtime and uptime. The number of the overhead process is in relation to the number of the transition. This leads to the fact that the overhead process has a load in relation to the number of the transition. The decoding process is therefore preferred to be performed in unit of more frames (to make the cycle of the intermittent operation be longer).

While there has been described about the fact that the data processor realizes to improve the speed of the frame processing to make the margin in processing time, the data processor is not needed to be designed to realize to improve the speed of the frame processing under the condition that the data processor can make the margin in processing time without improving the speed of the frame processing. In this case, the data processor has the same effect under which the data processor is designed to perform the intermittent operation realized by the process integration.

While there has been described about the fact that the data processor is designed to make the intermittent operation transit from the downtime to the uptime by the interruption of the storage amount manager 81, the data processor may be designed to make the intermittent operation transit from the downtime to the uptime by the interruption of the timer 82. The data processor has the same effect under which, for example, each part is activated by the timer designed to measure the period of downtime. The period of downtime is determined to the extent that the decoded data is continuously supplied to the DA converter 41 operating in real-time.

While there has been described about the fact that the system controller 51 is designed to stop supplying the clock and power to the first data storage 21 and the decoder 11, the system controller 51 may be designed to make at least the decoder 11 stop performing the decoding process. The system controller 51 may be designed to stop supplying the clock and power to other blocks in accordance with a system construction. This results from the fact that it is possible to stop supplying the clock or applying the voltage to the blocks not required to activate in the downtime of the intermittent operation.

(Third Preferred Embodiment)

Figure 7:
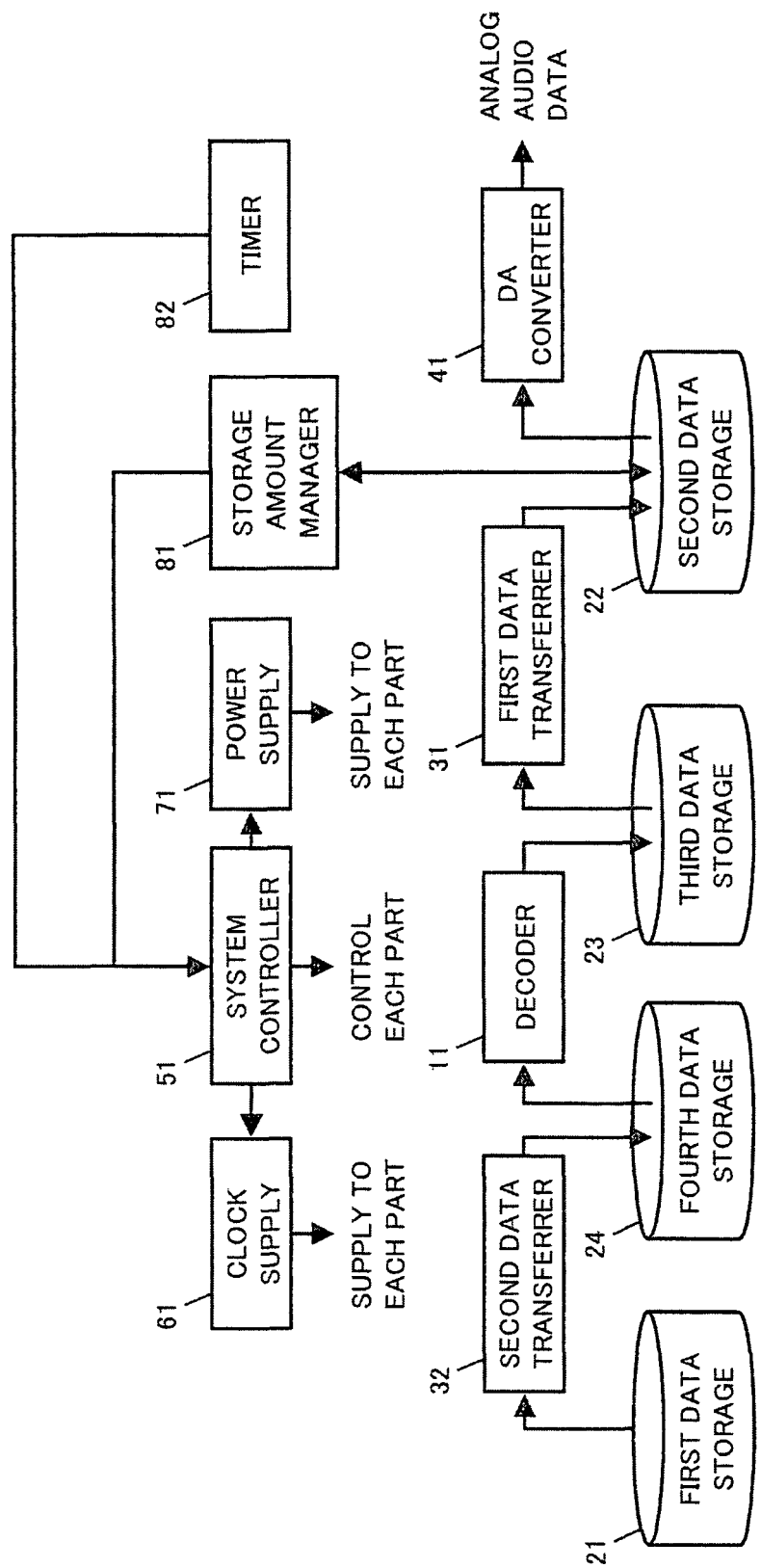
FIG. 7 is a schematic diagram showing a third preferred embodiment of the data processor according to the present invention.

FIG. 7 shows a schematic diagram of the third preferred embodiment of the data processor according to the present invention. The constituent elements common in FIGS. 3 and 7 will be omitted from the following detailed description and identified by the common reference numerals.

In FIG. 7, the data processor comprises a first data storage 21 for storing therein compressed data, a second data transferrer 32 for transferring the compressed data while reading the compressed data, a fourth data storage 24 for storing therein the compressed data transferred by the second data transferrer 32, a decoder 11 for decoding the compressed data while reading the compressed data, a third data storage 23 for storing therein decoded data decoded by the decoder 11, a first data transferrer 31 for transferring the decoded data while reading the decoded data, a second data storage 22 for storing therein decoded data transferred by the first data transferrer 31, a DA converter 41 for converting the decoded data into an analog signal, a clock supply 61 for generating and supplying clock, a power supply 71 for supplying power to each part of the data processor, a storage amount manager 81 for managing the amount of the data stored in the second data storage 22, a timer 82 for notifying activation timing to each part of the data processor, and a system controller 51 for controlling an operation of each part of the data processor.

In this embodiment, the system controller 51 constitutes a first controller and an activation controller according to the present invention. The storage amount manager 81 or the timer 82 constitutes a second controller according to the present invention. At least one of the clock supply 61 and the power supply 71 constitutes a clock-power controller according to the present invention.

The typical operation will be concretely described hereinafter.

The compressed data is stored in the first data storage 21. The first data storage 21 is, for example, constituted by a memory card. The compressed data is, for example, formed by AAC compressed audio data.

The compressed data is transferred by the second data transferrer 32 to the fourth data storage 24. The fourth data storage 24 is constituted by a semiconductor memory such as an SRAM.

The decoder 11 reads the compressed data from the fourth data storage 24, and decodes the compressed data into the decoded data. The decoder 11 is, for example, constituted by a DSP, and designed to decode the compressed data in accordance with a software process.

The decoded data decoded by the decoder 11 is stored into the third data storage 23. The third data storage 23 is constituted by a semiconductor memory such as an SRAM. The decoded data is, for example, formed by PCM data.

The decoded data is transferred by the first data transferrer 31 to the second data storage 22. The second data storage 22 is constituted by a semiconductor memory such as the SRAM.

The decoded data stored in the second data storage 22 is converted by the DA converter 41 into the analog signal to be outputted as analog audio data.

The clock supply 61 generates and supplies the clock needed for making each process performed.

The storage amount manager 81 manages the amount of the data stored in the second data storage 22, and notifies to the system controller 51 as appropriate.

The system controller 51 controls the decoder 11 to perform intermittent operation with dividing processing time from non-processing time explicitly by executing a process between reading the compressed data from the first data storage 21 and storing the decoded data into the second data storage 22 at a speed faster than real-time. The system controller 51 controls the process of reading the decoded data from the second data storage 22 and following processes to be executed in real-time, and directs the clock supply 61 to stop supplying the clock to the first data storage 21, the second data transferrer 32, the fourth data storage 24, the decoder 11, the third data storage 23, and the first data transferrer 31 under the deactivation state in downtime of the intermittent operation. The system controller 51 controls the intermittent operation to transit to the downtime with the third and fourth data storages 23 and 24 each holding one frame of the data without transferring whole of the data.

The operation to realize the intermittent operation and the control flow are similar to those of the second embodiment, and so will be omitted from the following detailed description.

Figure 8:
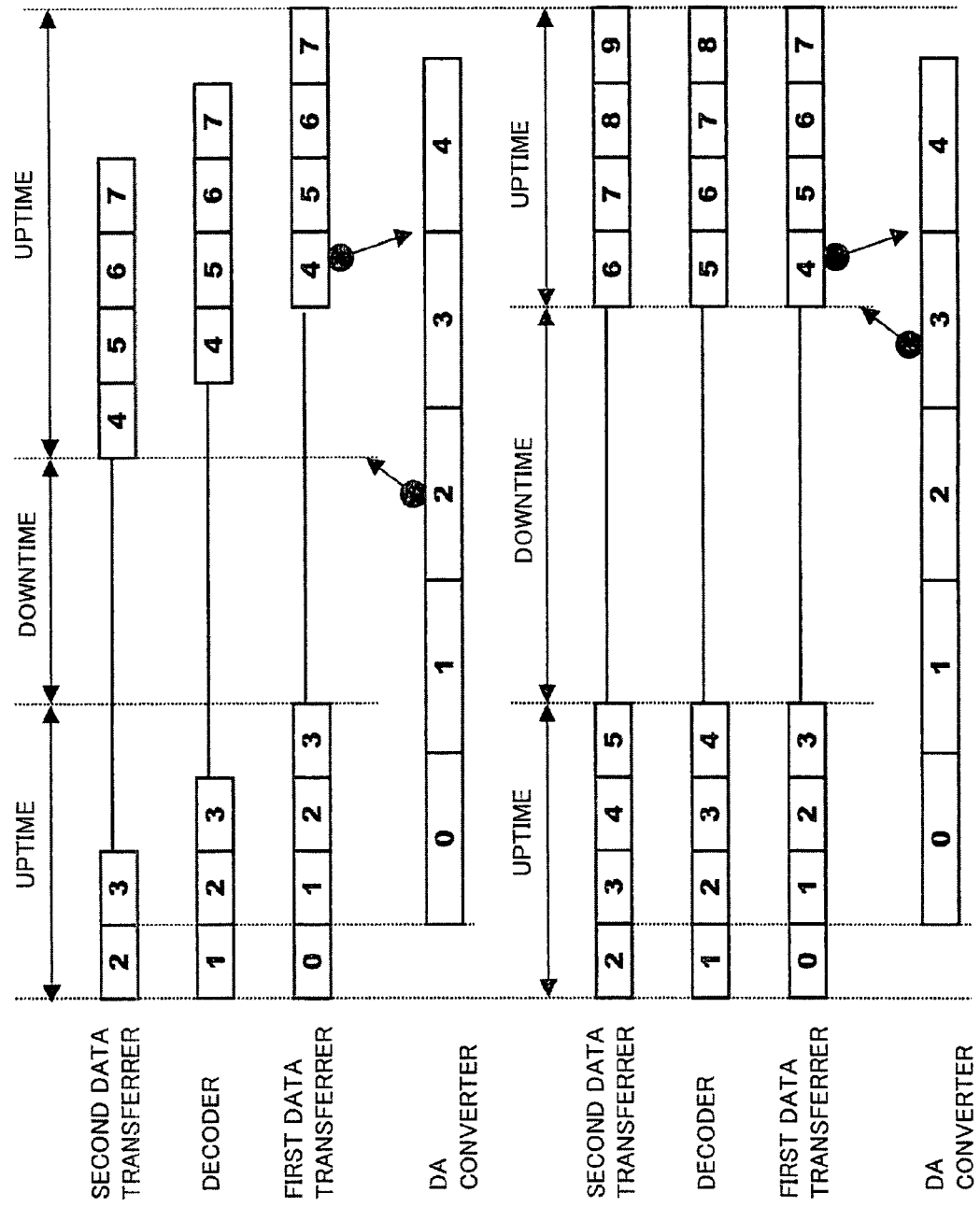
FIG. 8 is a timing chart showing an operation of the third preferred embodiment of the data processor according to the present invention.

FIG. 8 shows a timing chart of the third preferred embodiment according to the present invention.

Each period of the process for each frame, e.g. ACC frame, is indicated by each reference number 0-9. The intermittent operation transits to the downtime when the process for the frame 3 is completed. The upper side in FIG. 8 shows the example under which the intermittent operation transits to the downtime after the whole data stored in the storages is transferred, while the lower side shows the example under which the intermittent operation transits to the downtime with the storages holding one frame of the data.

In the example under which the intermittent operation transits to the downtime after the whole data stored in the storages is transferred, the audio data is interrupted when the DA conversion of the frame 4 is started without the frame 4 completely transferred. The process must, therefore, restart transferring of the compressed data while the DA conversion of the frame 2 is performed by the DA converter 41.

In the example under which the intermittent operation transits to the downtime with the storages holding one frame of the data, the data to be operated by each processing part is preliminarily stored in the data storages. The process can therefore be restarted immediately when the intermittent operation transits to the uptime. In the illustrative case, the compressed data of the frame 5 is stored in the fourth data storage 24, and the decoded data of the frame 4 is stored in the third data storage 23.

As will be seen from the foregoing description, it is to be understood that the data processor is designed to perform the intermittent operation by executing the process between reading the compressed data from the first data storage 21 and storing the decoded data into the second data storage 22 at the speed faster than real-time, and designed to stop supplying the clock in the downtime of the intermittent operation. The data processor can therefore decrease the offset current.

The data processor is required to make the intermittent operation transit to the uptime while the DA conversion of the frame 3 is performed. The period of the downtime can be therefore determined longer than that in the case under which the intermittent operation transits to the downtime after the whole data stored in the storages is transferred. The data processor can therefore further decrease the offset current.

There has been described in the foregoing embodiment about the fact that the data processor comprises the first and second transferrers 31 and 32. The data processor has the same effect with one of the first and second transferrers 31 and 32.

There has been described in the foregoing embodiment about the fact that the first data storage 21 is constituted by a memory card, but it is not intended to limit the present invention to the description. The data processor has the same effect under which the first data storage 21 is constituted by a storage medium, such as a magnetic tape, a magnetic disc, a semiconductor memory, or a hard disc, capable of storing therein the compressed data.

There has been described about the fact that the compressed data is formed by the AAC data, but it is not intended to limit the present invention to the description. The data processor has the same effect under which the compressed data is formed by compressed digital audio data, such as MP3 data.

While there has been described about the fact that the compressed data is audio data, the data processor has the same effect under which the compressed data is compressed image data, such as MPEG-2, MPEG4 or Motion JPEG data.

The compressed data may be encrypted in accordance with the DES, AES or the like. In this case, the data processor has the same effect under which the decoder 11 is constructed to decode the compressed data with decrypting the encryption of the compressed data.

There has been described about the fact that the decoder 11 is constituted by the DSP, but it is not intended to limit the present invention to the description. The data processor has the same effect under which the decoder 11 is constituted by other kind of processor such as a CPU. The decoder 11 may be also constituted by a hardware circuit or a combination of the processor and the hardware circuit.

There has been described about the fact that the system controller 51 is designed to stop supplying the clock in the downtime of the intermittent operation, but it is not intended to limit the present invention to the description. The data processor has the same effect under which the system controller 51 is designed to decrease a frequency of the clock from that of the clock in the uptime.

While there has been described about the fact that the system controller 51 is designed to stop supplying the clock in the downtime of the intermittent operation, the data processor has the same effect as decreasing the leak current under which the system controller 51 is designed to decrease a voltage applied by the power supply 71 or designed to stop applying the voltage (i.e. to apply 0V of the voltage). The data processor can also decrease the leak current under which the system controller 51 is designed to control a threshold voltage of a control transistor by controlling a substrate of a LSI.

There has been described about the fact that the decoding process is performed in unit of 5 frames, but it is not intended to limit the present invention to the description. The intermittent operation has the overhead process, such as clock control process and power control process, to transit between the downtime and uptime. The number of the overhead process is in relation to the number of the transition. This leads to the fact that the overhead process has a load in relation to the number of the transition. The decoding process is therefore preferred to be performed in unit of more frames (to make the cycle of the intermittent operation be longer).

While there has been described about the fact that the data processor realizes to improve the speed of the frame processing to make the margin in processing time, the data processor is not needed to be designed to realize to improve the speed of the frame processing under the condition that the data processor can make the margin in processing time without improving the speed of the frame processing. In this case, the data processor has the same effect under which the data processor is designed to perform the intermittent operation realized by the process integration.

There has been described about the fact that the intermittent operation transits to the downtime with the storages holding one frame of the data, but it is not intended to limit the present invention to the description. The data processor has the same effect under which the intermittent operation transits to the downtime with the storages holding the plurality frames of the data.

While there has been described about the fact that the data processor is designed to make the intermittent operation transit from the downtime to the uptime by the interruption of the storage amount manager 81, the data processor may be designed to make the intermittent operation transit from the downtime to the uptime by the interruption of the timer 82. The data processor has the same effect under which, for example, each part is activated by the timer designed to measure the period of downtime. The period of downtime is determined to the extent that the decoded data is continuously supplied to the DA converter 41 operating in real-time.

While there has been described about the fact that the system controller 51 is designed to stop supplying the clock and power to the first data storage 21, the second data transferrer 32, the fourth data storage 24, the decoder 11, the third data storage 23 and the first data transferrer 31, the system controller 51 may be designed to stop at least the decoder 11 performing the decode operation. The system controller 51 may be designed to stop supplying the clock and power to other blocks in accordance with a system construction. This results from the fact that it is possible to stop supplying the clock or applying the voltage to the blocks not required to activate in the downtime of the intermittent operation.

(Fourth Preferred Embodiment)

Figure 9:
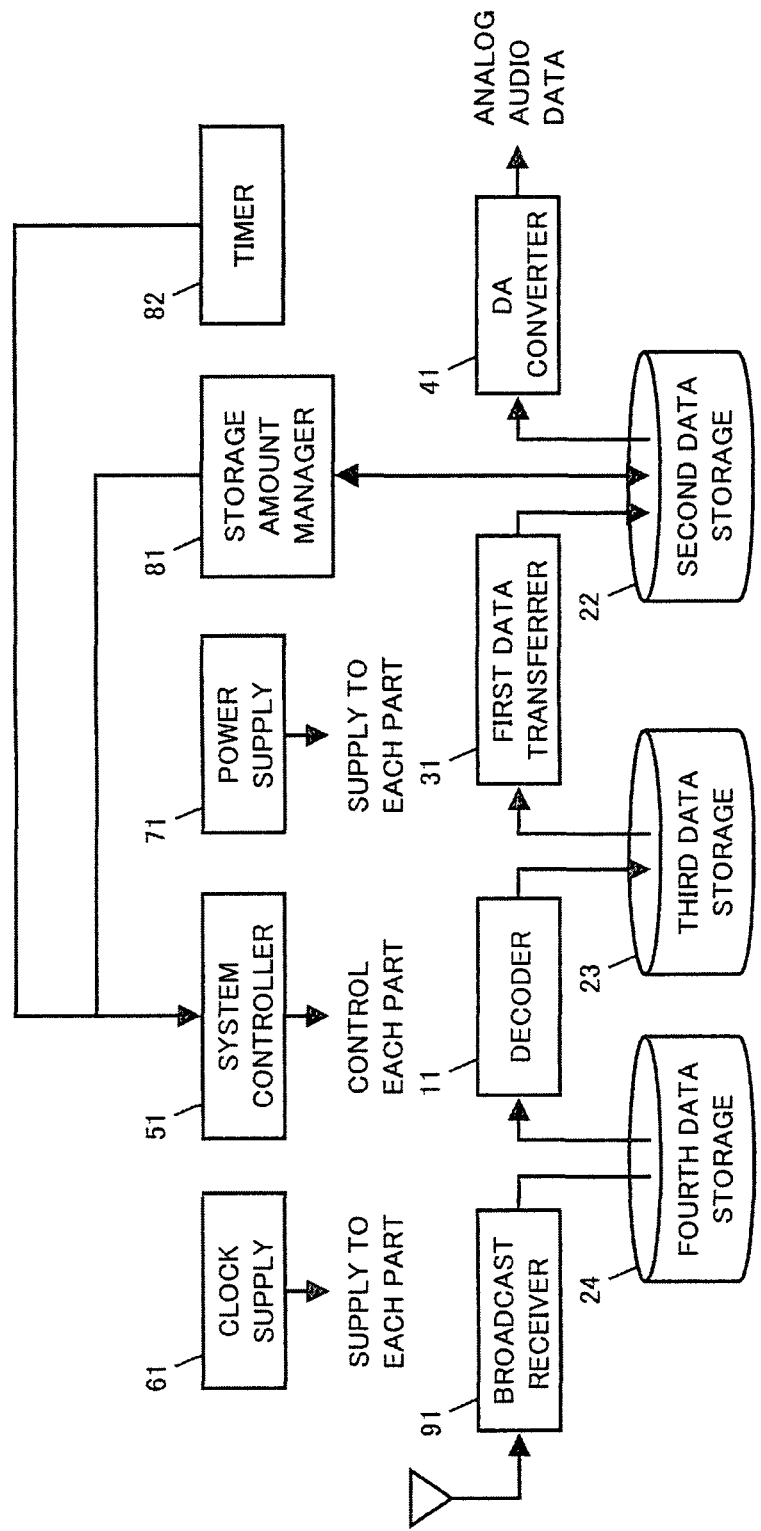
FIG. 9 is a schematic diagram showing a fourth preferred embodiment of the data processor according to the present invention.

FIG. 9 shows a schematic diagram of the fourth preferred embodiment of the data processor according to the present invention. The constituent elements common in FIGS. 3, 7 and 9 will be omitted from the following detailed description and identified by the common reference numerals.

In FIG. 9, the data processor comprises a broadcast receiver 91 for receiving a broadcast wave to extract the compressed data, a fourth data storage 24 for storing therein the compressed data, a decoder 11 for decoding the compressed data while reading the compressed data, a third data storage 23 for storing therein decoded data decoded by the decoder 11, a first data transferrer 31 for transferring the decoded data while reading the decoded data, a second data storage 22 for storing therein decoded data transferred by the first data transferrer 31, a DA converter 41 for converting the decoded data into an analog signal, a clock supply 61 for generating and supplying clock, a power supply 71 for supplying power to each part of the data processor, a storage amount manager 81 for managing the amount of the data stored in the second data storage 22, a timer 82 for notifying activation timing to each part of the data processor, and a system controller 51 for controlling an operation of each part of the data processor.

In this embodiment, the system controller 51 constitutes a first controller and an activation controller according to the present invention. The storage amount manager 81 or the timer 82 constitutes a second controller according to the present invention. At least one of the clock supply 61 and the power supply 71 constitutes a clock/power controller according to the present invention.

The typical operation will be concretely described hereinafter.

The broadcast receiver 91 receives the broadcast wave such as a digital terrestrial broadcasting wave, and extracts the compressed data indicative of sound or the like. The compressed data is, for example, formed by AAC compressed audio data.

The compressed data is stored into the fourth data storage 24. The fourth data storage 24 is constituted by a semiconductor memory such as an SRAM.

The decoder 11 reads the compressed data from the fourth data storage 24, and decodes the compressed data into the decoded data. The decoder 11 is, for example, constituted by a DSP, and designed to decode the compressed data in accordance with a software process.

The decoded data decoded by the decoder 11 is stored into the third data storage 23. The third data storage 23 is constituted by a semiconductor memory such as an SRAM. The decoded data is, for example, formed by PCM data.

The decoded data is transferred by the first data transferrer 31 to the second data storage 22. The second data storage 22 is constituted by a semiconductor memory such as the SRAM.

The decoded data stored in the second data storage 22 is converted by the DA converter 41 into the analog signal to be outputted as analog audio data.

The clock supply 61 generates and supplies the clock needed for making each process performed.

The storage amount manager 81 manages the amount of the data stored in the second data storage 22, and notifies to the system controller 51 as appropriate.

The system controller 51 controls the decoder 11 to perform intermittent operation with dividing processing time from non-processing time explicitly by executing a process between reading the compressed data from the fourth data storage 24 and storing the decoded data into the second data storage 22 at a speed faster than real-time. The system controller 51 controls execution of the process of storing the compressed data by the broadcast receiver 91, the process of reading the decoded data from the second data storage 22 and following processes in real-time, and directs the clock supply 61 to stop supplying the clock to the decoder 11, the third data storage 23 and the first data transferrer 31 under the deactivation state in downtime of the intermittent operation. The system controller 51 controls the intermittent operation to transit to the downtime with the third and fourth data storages 23 and 24 each holding one frame of the data without transferring whole of the data.

The operation to realize the intermittent operation and the control flow are similar to those of the third embodiment, and so will be omitted from the following detailed description.

Figure 10:
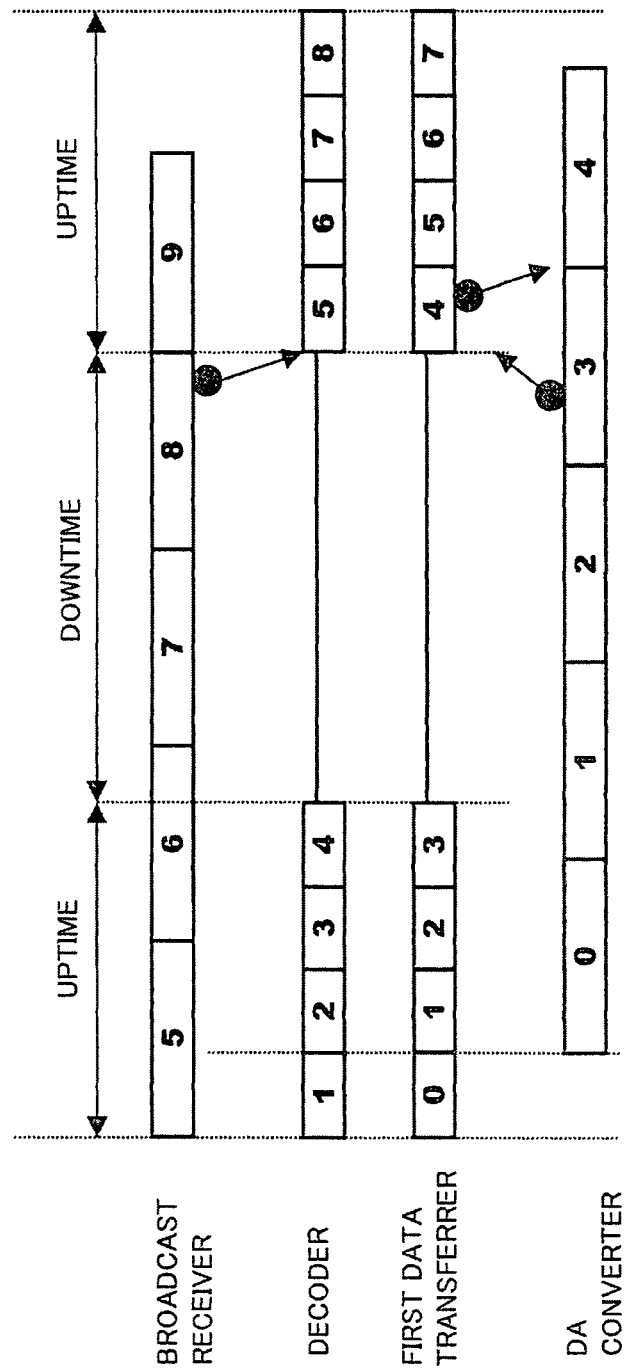
FIG. 10 is a timing chart showing an operation of the fourth preferred embodiment of the data processor according to the present invention.
Figure 11:
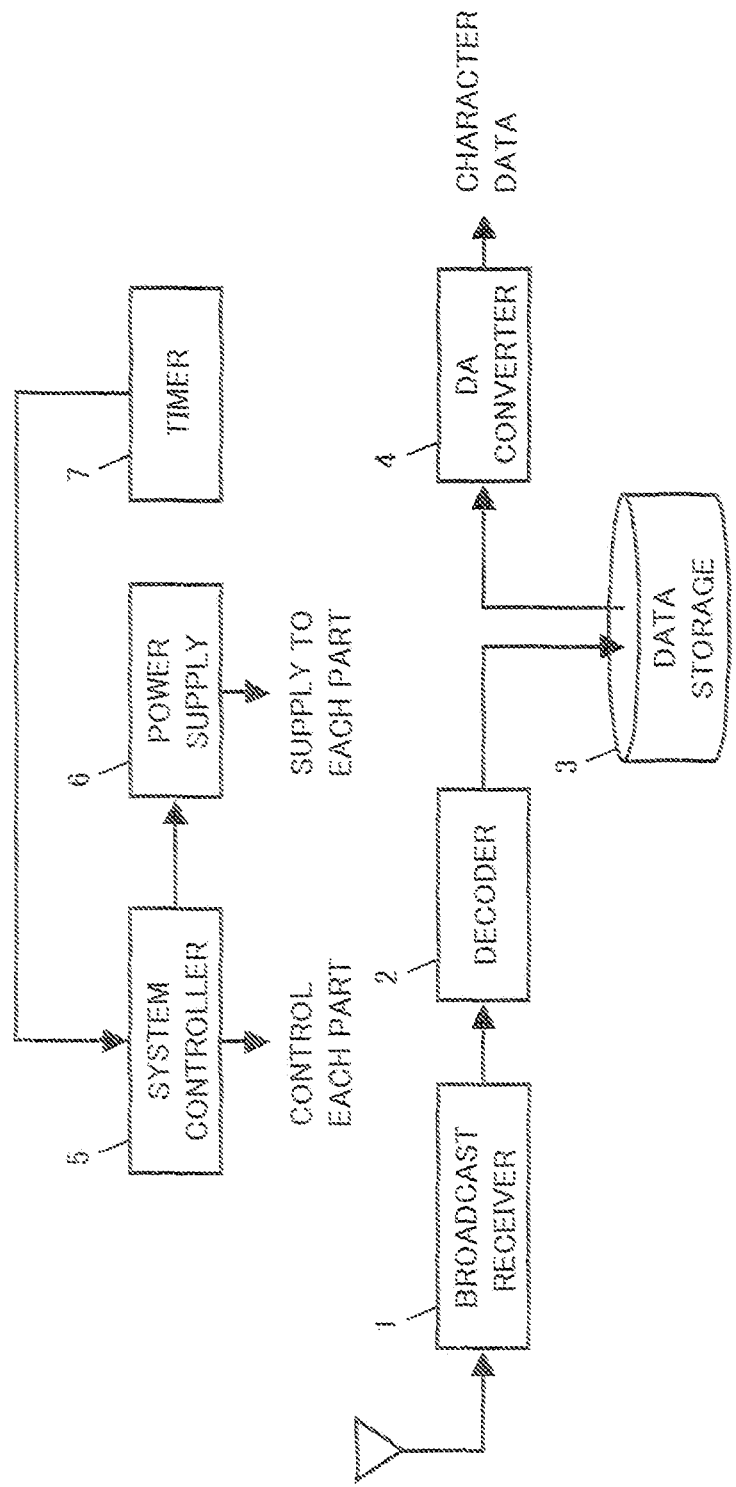
FIG. 11 is a schematic diagram showing the conventional data processor disclosed in the Patent Document 1.

FIG. 10 shows a timing chart of the fourth preferred embodiment according to the present invention.

Each period of the process for each frame, e.g. ACC frame, is indicated by each reference number 0-9. The broadcast receiver 91 operates in real-time. The intermittent operation transits to the downtime when the frame 4 is completely operated by the decoder 11 and the frame 3 is completely operated by the first data transferrer 31. The DA converter 41 operates in real-time.

The intermittent operation transits to the downtime with the storages holding one frame of the data, the data to be operated by each processing part is preliminarily stored in the data storages. The process can therefore be restarted immediately when the intermittent operation transits to the uptime. In the illustrative case, the compressed data of the frames up to the frame 8 is stored in the fourth data storage 24, and the decoded data of the frame 4 is stored in the third data storage 23.

As will be seen from the foregoing description, it is to be understood that the data processor comprising the input part (for receiving the broadcast wave) and the output part (for performing the DA conversion) each designed to process in real-time can decrease the offset current in the intermittent operated part including the decoder 11. The data processor is required to make the intermittent operation transit to the uptime while the DA conversion of the frame 3 is performed. The period of the downtime can be therefore determined longer than that in the case under which the intermittent operation transits to the downtime after the whole data stored in the storages is transferred. The data processor can therefore further decrease the offset current.

The data processor may comprise a network interface, in place of the broadcast receiver 91, connected with a wired or wireless network to receive AV contents. The network interface is designed to extract the compressed data from the AV contents. In this case, the network interface receives the data from, the network such as the Internet at the speed in accordance with the transmission speed of the network, and designed to store the data into the fourth data storage 24. The subsequent operation is the same as the operation described with reference to FIG. 9.

As will be seen from the foregoing description, it is also to be understood that the data processor comprising the input part (for receiving from the network) and the output part (for performing the DA conversion) each designed to process in real-time can decrease the offset current in the intermittent operated part including the decoder 11. The data processor is required to make the intermittent operation transit to the uptime while the DA conversion of the frame 3 is performed. The period of the downtime can be therefore determined longer than that in the case under which the intermittent operation transits to the downtime after the whole data stored in the storages is transferred. The data processor can therefore further decrease the offset current.

There has been described about the fact that the compressed data is formed in accordance with the AAC, but it is not intended to limit the present invention to the description. The data processor has the same effect under which the compressed data is formed by compressed digital audio data, such as MP3 data.

While there has been described about the fact that the compressed data is audio data, the data processor has the same effect under which the compressed data is compressed image data, such as MPEG-2, MPEG4 or Motion JPEG data.

The compressed data may be encrypted in accordance with the DES, AES or the like. In this case, the data processor has the same effect under which the decoder 11 is constructed to decode the compressed data with decrypting the encryption of the compressed data.

There has been described about the fact that the decoder 11 is constituted by the DSP, but it is not intended to limit the present invention to the description. The data processor has the same effect under which the decoder 11 is constituted by other kind of processor such as a CPU. The decoder 11 may be also constituted by a hardware circuit or a combination of the processor and the hardware circuit.

There has been described about the fact that the system controller 51 is designed to stop supplying the clock in the downtime of the intermittent operation, but it is not intended to limit the present invention to the description. The data processor has the same effect under which the system controller 51 is designed to decrease a frequency of the clock from that of the clock in the uptime.

While there has been described about the fact that the system controller 51 is designed to stop supplying the clock in the downtime of the intermittent operation, the data processor has the same effect as decreasing the leak current under which the system controller 51 is designed to decrease a voltage applied by the power supply 71 or designed to stop applying the voltage (i.e. to apply 0V of the voltage). The data processor can also decrease the leak current under which the system controller 51 is designed to control a threshold voltage of a control transistor by controlling a substrate of a LSI.

There has been described about the fact that the decoding process is performed in unit of 5 frames, but it is not intended to limit the present invention to the description. The intermittent operation has the overhead process, such as clock control process and power control process, to transit between the downtime and uptime. The number of the overhead process is in relation to the number of the transition. This leads to the fact that the overhead process has a load in relation to the number of the transition. The decoding process is therefore preferred to be performed in unit of more frames (to make the cycle of the intermittent operation be longer).

While there has been described about the fact that the data processor realizes to improve the speed of the frame processing to make the margin in processing time, the data processor is not needed to be designed to realize to improve the speed of the frame processing under the condition that the data processor can make the margin in processing time without improving the speed of the frame processing. In this case, the data processor has the same effect under which the data processor is designed to perform the intermittent operation realized by the process integration.

There has been described about the fact that the intermittent operation transits to the downtime with each part holding one frame of the data, but it is not intended to limit the present invention to the description. The data processor has the same effect under which the intermittent operation transits to the downtime with each part holding the plurality frames of the data.

While there has been described about the fact that the data processor is designed to make the intermittent operation transit from the downtime to the uptime by the interruption of the storage amount manager 81, the data processor may be designed to make the intermittent operation transit from the downtime to the uptime by the interruption of the timer 82. The data processor has the same effect under which, for example, each part is activated by the timer designed to measure the period of downtime. The period of downtime is determined to the extent that the decoded data is continuously supplied to the DA converter 41 operating in real-time.

While there has been described about the fact that the system controller 51 is designed to stop supplying the clock and power to the decoder 11, the third data storage 23 and the first data transferrer 31, the system controller 51 may be designed to stop at least the decoder 11 performing the decode operation. The system controller 51 may be designed to stop supplying the clock and power to other blocks in accordance with a system construction. This results from the fact that it is possible to stop supplying the clock or applying the voltage to the blocks not required to activate in the downtime of the intermittent operation.

INDUSTRIAL APPLICABILITY

The data processor according to the present invention is available for an audio player, a video player, a mobile phone capable of the AV processing, or the like, mounted on a mobile device powered by battery.

What is claimed is:

1. A data processor comprising:
a first data storage for storing therein compressed data;
a data transferrer for transferring the compressed data while reading the compressed data;
a second data storage for storing therein the compressed data transferred by the data transferrer;
a decoder for decoding the compressed data into decoded data to output while reading the compressed data from the second data storage;
a third data storage for storing therein the decoded data outputted from the decoder;
a DA converter for converting the decoded data into an analog signal while reading the decoded data from the third data storage in real-time;
a first controller for controlling at least the decoder to perform intermittent operation by executing a process between reading the compressed data from the first data storage and storing the decoded data into the third data storage at a speed faster than real-time;
a clock/power controller for controlling supply of at least one of clock and power to the decoder and the first controller, and making a restriction of supply of at least one of the clock and power to the decoder and the first controller in downtime of the intermittent operation;
a second controller for managing a storage status of the decoded data stored in the third data storage, and outputting a control signal in accordance with the storage status; and
an activation controller for controlling the clock/power controller to lift the restriction in response to reception of the control signal,
wherein the first controller controls the decoder to transit to the downtime with the second data storage holding at least one frame of the compressed data.

2. A data processor as set forth in claim 1, wherein some of the data stored in the second data storage remains in the second data storage during downtime.

* * * * *